Patented June 25, 1935

2,006,002

UNITED STATES PATENT OFFICE 2,006,002

MANUFACTURE OF PHOTOGRAPHIC SILVER HALIDE EMULSION LAYERS

Wilhelm Schneider, Dessau in Anhalt, Germany, assignor to Agfa Ansco Corporation, Binghamton, N. Y., a corporation of New York No Drawing. Application November 24, 1933, Serial No. 699,635. In Germany November 29, 1932

9 Claims. (Cl. 95—7)

My present invention relates to photographic silver halide emulsion layers.

One of its objects are silver-halide emulsion layers containing besides gelatin a polymeric carboxylic acid or a salt thereof, or the polymerization product of a mixture of unsaturated carboxylic acids or a derivative thereof. Further objects will be seen from the detailed specification following hereafter.

I have found that the known polymeric carboxylic acids, for instance, polyacrylic acid, the salts of such acids and polymerization products from a mixture of several unsaturated carboxylic acids or the derivatives thereof have an excellent action as preservative colloids for silver halide.

According to this invention this observation is applied to the manufacture of photographic silver halide emulsion layers rich in silver, by replacing in the known processes for the manufacture of silver halide emulsions a part of the binding agent, for instance, gelatin or collodion, by a reduced quantity of one of the substances above referred to. Thus, for instance, in a batch of emulsion containing 150 grams of gelatin, one third to one half of the amount of gelatin can be replaced by 5 to 20 grams of polyacrylic acid. Other substances suitable for the purpose in question are, for instance, the poly(styrol-maleic acid anhydride) and the polymerization product from a mixture of acrylic acid nitrile and free acrylic acid. It will be evident that the emulsions obtained according to the present invention are considerably richer in silver than were the emulsions made in hitherto known manner. The emulsion layers prepared according to the present invention are suitable for use as negative layers as well as positive layers and may be applied to any kind of support, for instance, a film, a plate or paper.

The following examples illustrate the invention:

Example 1

Solution I: Grams
Water _____ 400
NH₄Br _____ 80
KI _____ 1.16
Gelatin _____ 30
Solution II:
Water _____ 800
AgNO₃ _____ 120
Conc. ammonia _____ 120
Solution III:
Gelatin _____ 170

A good negative sensitiveness is obtained by running Solution II at 45° in the course of 10 minutes into solution I, allowing this mixture to stand for 15 minutes, then adding Solution III and digesting for 20 minutes. Then the mixture is caused to solidify, washed out in the usual manner and caused to ripen at 45° for 120 to 180 minutes, according to the kind of gelatin used.

When proceeding in the same manner, but substituting 6 to 8 grams of polyacrylic acid for 80 grams of gelatin employed in Solution III and shortening the ripening process by 10 to 30 minutes, an emulsion is obtained which has nearly the same sensitiveness and distribution of grain but has a considerably higher content of silver.

Example 2

The emulsion is prepared as described in Example 1, but in Solution III 80 grams of gelatin are replaced by 9 grams of the potassium salt of the polymerization product from a mixture of acrylic acid nitrile and free acrylic acid.

Example 3

The emulsion is prepared as described in Example 1, but in Solution III 80 grams of the gelatin are replaced by the sodium salt of poly-(styrol-maleic acid anhydride).

Example 4

Solution I:
10 grams of gelatin
48 grams of potassium bromide
2,5 grams of potassium iodide
650 cc. of water
Solution II:
65 grams of silver nitrate
1000 cc. of water
Solution III:
150 grams of gelatin
450 cc. of water Solution II is run in Solution I at a temperature of 80° C. in the course of 15 minutes; the mixture is digested for 15 to 20 minutes and then Solution III is added. After solidification and the usual washing, the emulsion is ripened for about 1 hour at 45° C. and an emulsion of good negative-sensitiveness is obtained. In this emulsion 80 grams of gelatin in Solution III can be replaced by 8 grams of the potassium salt of the polymerization product from a mixture of the nitrile of acrylic acid and free acrylic acid.

Example 5

The emulsion is prepared as described in Example 4, but in Solution III 80 grams of the gelatin are replaced by 9 grams of the sodium salt of poly(styrol-maleic acid anhydride).

*Example 6*

The emulsion is prepared as described in Example 4, but in Solution III 80 grams of the gelatin are replaced by 6 to 8 grams of polyacrylic acid.

The ratio of silver halide to gelatin to polymeric carboxylic acid may amount to about 100:95:8 when preparing an emulsion under normal conditions, that is to say the ratio of silver-halide to binding agent is about 100:103, or practically unity, whereas the ratio of silver-halide to binding agent when using only gelatin is about 100:170. When working with diluted emulsions the ratio of silver halide to gelatin to polymeric carboxylic acid may even amount to 100:60:15.

What I claim is:

1. In the process of manufacturing photographic silver halide emulsion layers the step which comprises adding to a mixture containing silver-halide, gelatin and water a mixture of gelatin and a compound selected from the group consisting of artificial polymeric carboxylic acids containing in their molecule a methylene group, salts of artificial polymeric carboxylic acids containing in their molecule a methylene group, polymerization products containing in their molecule a methylene group from mixtures of unsaturated carboxylic acids and of the derivatives thereof.

2. In the process of manufacturing photographic silver halide emulsion layers the step which comprises adding to a mixture containing silver-halide, gelatin and water a mixture of gelatin and polyacrylic acid.

3. In the process of manufacturing photographic silver halide emulsion layers the step which comprises adding to a mixture containing silver-halide, gelatin and water a mixture of gelatin and the sodium salt of poly(styrol-maleic acid).

4. In the process of manufacturing photographic silver halide emulsion layers the step which comprises adding to a mixture containing silver-halide, gelatin and water a mixture of gelatin and the potassium salt of the polymerization product of a mixture from the nitrile of polyacrylic acid and polyacrylic acid.

5. A photographic silver halide emulsion layer containing as a binding agent a mixture of gelatin and a compound selected from the group consisting of artificial polymeric carboxylic acids containing in their molecule a methylene group, salts of artificial polymeric carboxylic acids containing in their molecule a methylene group, polymerization products containing in their molecule a methylene group from mixtures of unsaturated carboxylic acids and of the derivatives thereof.

6. A photographic silver halide emulsion containing as a binding agent a mixture of gelatin and polyacrylic acid.

7. A photographic silver halide emulsion containing as a binding agent a mixture of gelatin and the sodium salt of poly(styrol-maleic acid).

8. A photographic silver halide emulsion containing as a binding agent a mixture of gelatin and the potassium salt of the polymerization product of a mixture from the nitrile of polyacrylic acid and polyacrylic acid.

9. A photographic silver halide emulsion layer containing as a binding agent a mixture of gelatin and a compound selected from the group consisting of artificial polymeric carboxylic acids containing in their molecule a methylene group, salts of artificial polymeric carboxylic acids containing in their molecule a methylene group, polymerization products containing in their molecule a methylene group from mixtures of unsaturated carboxylic acids and of derivatives thereof, and silver halide, the ratio of silver halide to said mixture being substantially greater than 100 to 170.

WILHELM SCHNEIDER.